(12) United States Patent
Champion et al.

(10) Patent No.: US 8,173,947 B2
(45) Date of Patent: May 8, 2012

(54) SCANNING MIRROR POSITION DETERMINATION

(75) Inventors: Mark Champion, Kenmore, WA (US);
Steve Holmes, Sammamish, WA (US);
Lakhbir Singh Gandhi, Auburn, WA (US); Harpal Singh Sira, Surrey (CA);
Bruce C. Rothaar, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 384 days.

(21) Appl. No.: 12/556,419

(22) Filed: Sep. 9, 2009

(65) Prior Publication Data

US 2011/0058045 A1 Mar. 10, 2011

(51) Int. Cl.
*H01J 40/14* (2006.01)
(52) U.S. Cl. ............. 250/208.3; 250/214 R; 250/214 A; 330/59; 359/223.1
(58) Field of Classification Search ................ 250/208.3, 250/206.1, 206.2, 214 R, 214 A, 234; 330/59, 330/110, 151, 308; 359/223.1, 239, 291, 359/292

See application file for complete search history.

(56) References Cited

U.S. PATENT DOCUMENTS

| 7,049,896 | B1 * | 5/2006 | Sutardja ........................ 331/1 A |
| 2003/0141439 | A1 * | 7/2003 | Heminger et al. ............ 250/221 |
| 2003/0184373 | A1 | 10/2003 | Cameron et al. |
| 2004/0061925 | A1 | 4/2004 | Azarov et al. |
| 2005/0286111 | A1 | 12/2005 | Muenter |

OTHER PUBLICATIONS

Microvision, Inc., "International Search Report and Written Opinion", *Search Report and Written Opinioin for PCT/US2010/045756* Mar. 31, 2011.

* cited by examiner

*Primary Examiner* — Kevin Pyo
(74) *Attorney, Agent, or Firm* — Kevin D. Wills (57) ABSTRACT

A scanning projector includes a mirror that scans in two dimensions, at least one of which is sinusoidal. A position sensor provides a position signal that represents an angular displacement of the mirror. The position signal is amplified by an amplifier with time variant characteristics. A beam position determination component compensates for the time variant characteristics of the amplifier.

13 Claims, 7 Drawing Sheets

SCANNING MIRROR POSITION DETERMINATION

FIELD

The present invention relates generally to display devices, and more specifically to scanning display devices.

BACKGROUND

Some display devices create an image by scanning a beam of varying intensity across a display surface. For example, in cathode ray tubes (CRTs), an electron beam is scanned across a surface in a row and column pattern. Further, some projection display devices scan a light source across a surface in a row and column pattern. In these display devices, the beam intersects each pixel location as it paints the image row by row. The intensity of the scanned beam is then modulated as it passes over each display pixel location.

Some display devices may scan a beam in a trajectory that does not exactly coincide with rows and columns. For example, a projection display may scan a beam in a non-linear pattern such as a sinusoidal pattern. Non-linear beam trajectories cause the beam to traverse portions of the image that have no underlying pixel data, because there is no guarantee that a beam in a non-linear trajectory will intersect each point at which a pixel exists.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
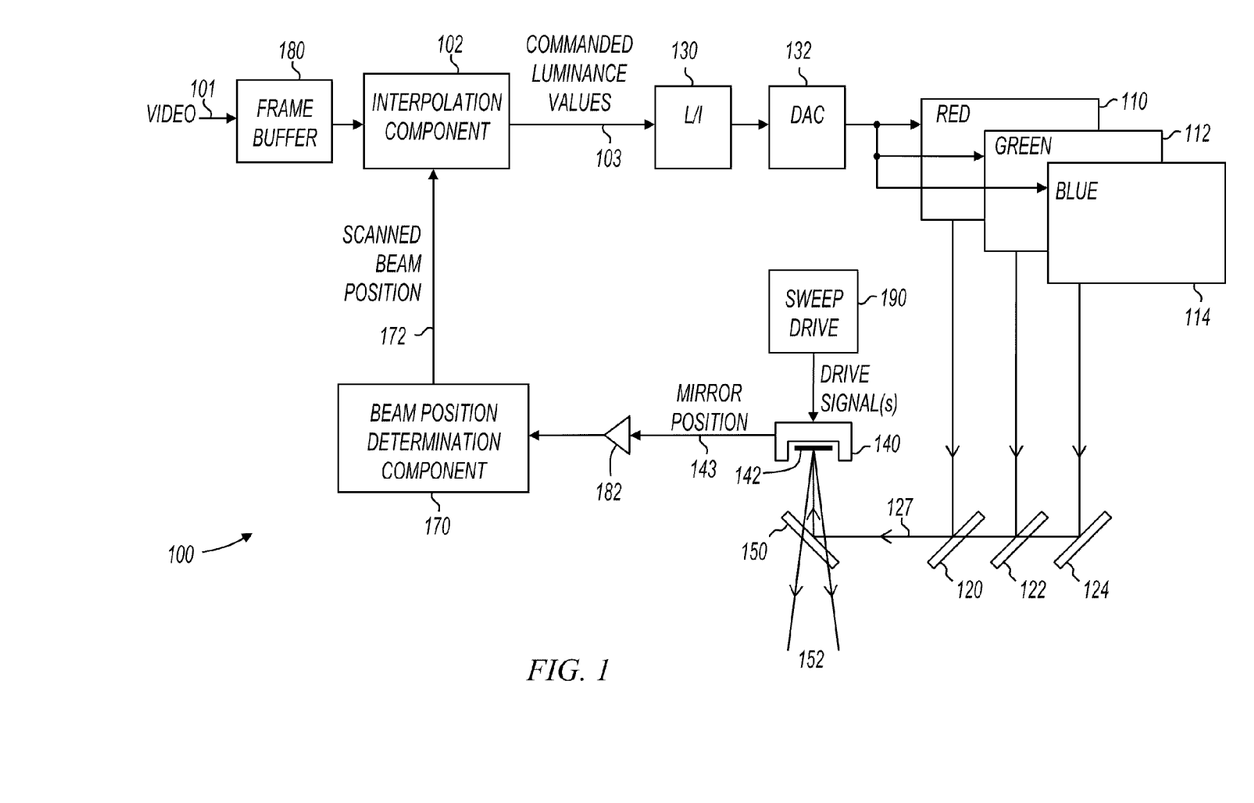
FIG. 1 shows a projection system with an a scanning mirror.

FIG. 1 shows a projection system with a scanning mirror. Projection system 100 includes frame buffer 180, interpolation component 102, luminance-to-current (L/I) translator 130, digital-to-analog converter (DAC) 132, and laser light sources 110, 112, and 114. Projection system 100 also includes mirrors 120, 122, and 124, filter/polarizer 150, microelectromechanical machine (MEMS) device 140 having mirror 142, amplifier 182, and beam position determination component 170.

In operation, frame buffer 180 receives video data on node 101, and provides the video data as necessary to interpolation component 102. Interpolation component 102 interpolates between pixels in the video data, and produces commanded luminance values at 103 to drive the laser light sources when pixels are to be displayed. The commanded luminance values are converted to digital current values by L/I translator 130, and the digital current values are converted to analog currents by DAC 132. The analog currents are produced at times specified by a pixel clock (not shown). System 100 may include multiple L/I translators and DACs. For example, separate L/I translators and DACs may be provided for each color (red, green, blue).

Red, green, and blue light is provided by the laser light sources 110, 112, and 114, although other light sources, such as color filters or light emitting diodes (LEDs) or edge-emitting LEDs, could easily be substituted. One advantage of lasers is that their light is produced as a column, and this column emerges as a narrow beam.

The MEMS mirror 142 rotates on two axes in response to electrical stimuli shown as "DRIVE SIGNAL(s)" provided by sweep drive 190. In operation, sweep drive 190 provides signals to MEMS device 140 to cause a beam to scan a trajectory to paint a display image. The beam scan trajectory may take any form. For example, the scan trajectory may be linear in one direction and non-linear in another direction. Various embodiments further described below have a linear trajectory in the vertical direction and a non-linear trajectory in the horizontal direction. Other embodiments have non-linear trajectories in both vertical and horizontal directions.

MEMS device 140 includes one or more position sensors to sense the position of mirror 142. For example, in some embodiments, MEMS device 140 includes a piezoresistive sensor that delivers a voltage that is proportional to the deflection of the mirror on the horizontal axis. This is shown as the mirror position signal at 143. Further, in some embodiments, MEMS device 140 includes an additional piezoresistive sensor that delivers a voltage that is proportional to the deflection of the mirror on the vertical axis.

The mirror position signal at 143 is amplified by amplifier 182, and the resulting amplified signal is provided to beam position determination component 170. Beam position determination component 170 determines the position of the scanned beam in the display image at times when pixels are to be displayed.

Amplifier 182 may have time variant characteristics. For example, amplifier 182 may exhibit a delay that varies over time and temperature. Beam determination component 170 includes a circuit to compensate for the time variant characteristics of amplifier 182. Various embodiments of these circuits are described in more detail with reference to FIG. 4. When properly compensated, the scanned beam position information at 172 is a digital representation of a sine wave that corresponds to sinusoidal deflection of mirror 142.

The scanned beam position at 172 represents the horizontal beam position as it traverses a sinusoidal trajectory. This beam position information is provided to interpolation component 102. Interpolation component 102 interpolates between pixels in the video data, and produces commanded luminance values at 103 to drive the laser light sources when pixels are to be displayed. In some embodiments, approximations are made as to the vertical scan position. For example, in some embodiments, the vertical scan position may be approximated as a constant row, even though this may not be 100% accurate. Also for example, in some embodiments, the vertical scan position may be approximated as a closest row, even though this may not be 100% accurate. In other embodiments, interpolation component 102 interpolates in both the horizontal and vertical dimension. These and other interpolation embodiments are further described below with reference to later figures.

The various components shown in FIG. 1 may be implemented in many ways. For example, beam position determination component 170 may be implemented in dedicated hardware, software or any combination. When operating at slower speeds, software implementations may be fast enough to satisfy display rate requirements. When operating at high speeds, a dedicated hardware implementation may be fast enough to satisfy display rate requirements.

Figure 2:
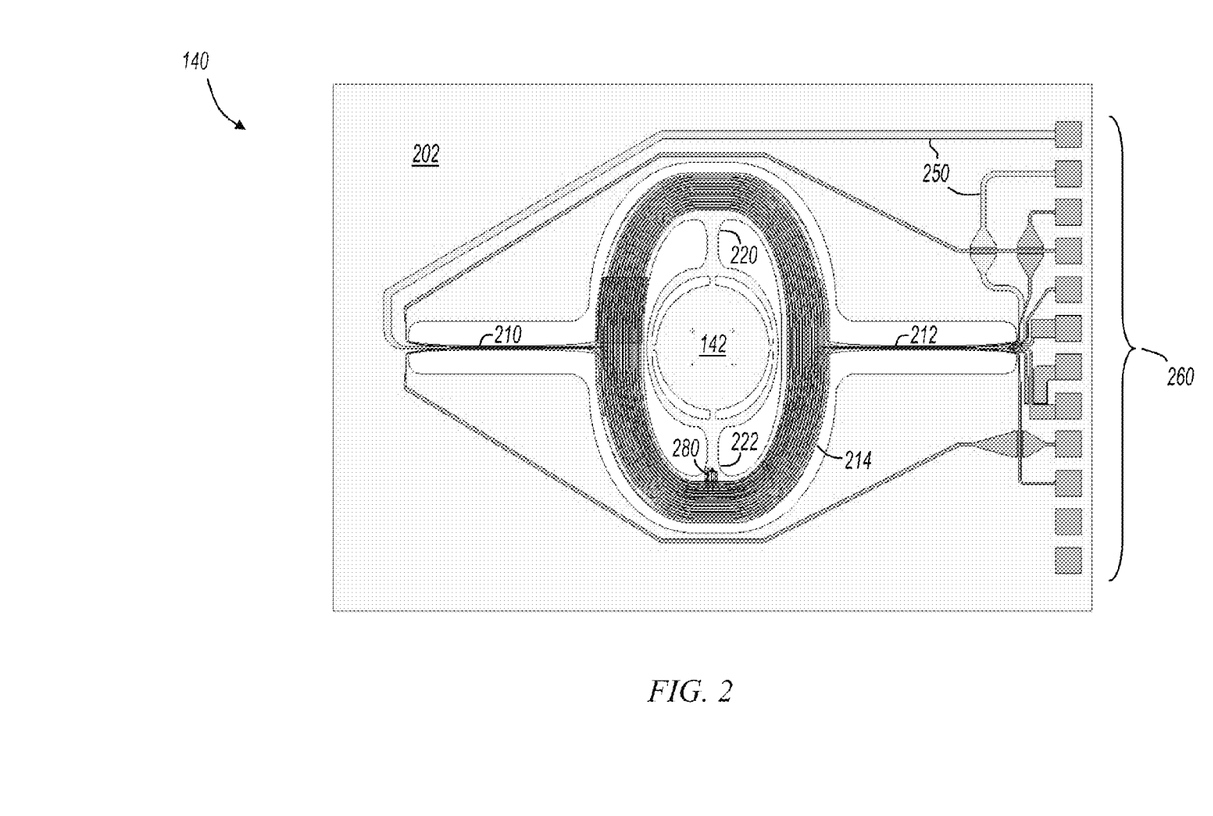
FIG. 2 shows a plan view of a microelectromechanical system (MEMS) device with a scanning mirror.

FIG. 2 shows a plan view of a microelectromechanical system (MEMS) device with a scanning mirror. MEMS device 140 includes fixed platform 202, scanning platform 214 and scanning mirror 142. Scanning platform 214 is coupled to fixed platform 202 by flexures 210 and 212, and scanning mirror 142 is coupled to scanning platform 214 by flexures 220 and 222. Scanning platform 214 has a drive coil connected to drive lines 250. Current driven into drive lines 250 produces a current in the drive coil. MEMS device 140 also incorporates one or more integrated piezoresistive position sensors. Piezoresistive sensors 280 produce a voltage that represents the displacement of mirror 142 with respect to scanning platform 214. In some embodiments, MEMS device 140 includes one position sensor for each axis. Two of the interconnects 260 are coupled to drive lines 250. The remaining interconnects provide for the integrated position sensors for each axis.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 214, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

Scanning platform 214 moves relative to fixed platform 202 in response to the torque. The long axis of flexures 210 and 212 form a pivot axis. Flexures 210 and 212 are flexible members that undergo a torsional flexure, thereby allowing scanning platform 214 to rotate on the pivot axis and have an angular displacement relative to fixed platform 202. Flexures 210 and 212 are not limited to torsional embodiments as shown in FIG. 2. For example, in some embodiments, flexures 210 and 212 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

In some embodiments, scanning mirror 142 moves relative to scanning platform 214 at a resonant frequency, although this is not a limitation of the present invention. The long axis of flexures 220 and 222 form a pivot axis. Flexures 220 and 222 are flexible members that undergo a torsional flexure, thereby allowing scanning mirror 142 to rotate on the pivot axis and have an angular displacement relative to scanning platform 214. Flexures 220 and 222 are not limited to torsional embodiments as shown in FIG. 2. For example, in some embodiments, flexures 220 and 222 take on other shapes such as arcs, "S" shapes, or other serpentine shapes.

The particular MEMS device embodiment shown in FIG. 2 is provided as an example, and the various embodiments of the invention are not limited to this specific implementation. For example, any scanning mirror capable of providing mirror position information in one or both axes maybe incorporated without departing from the scope of the present invention.

Figure 3:
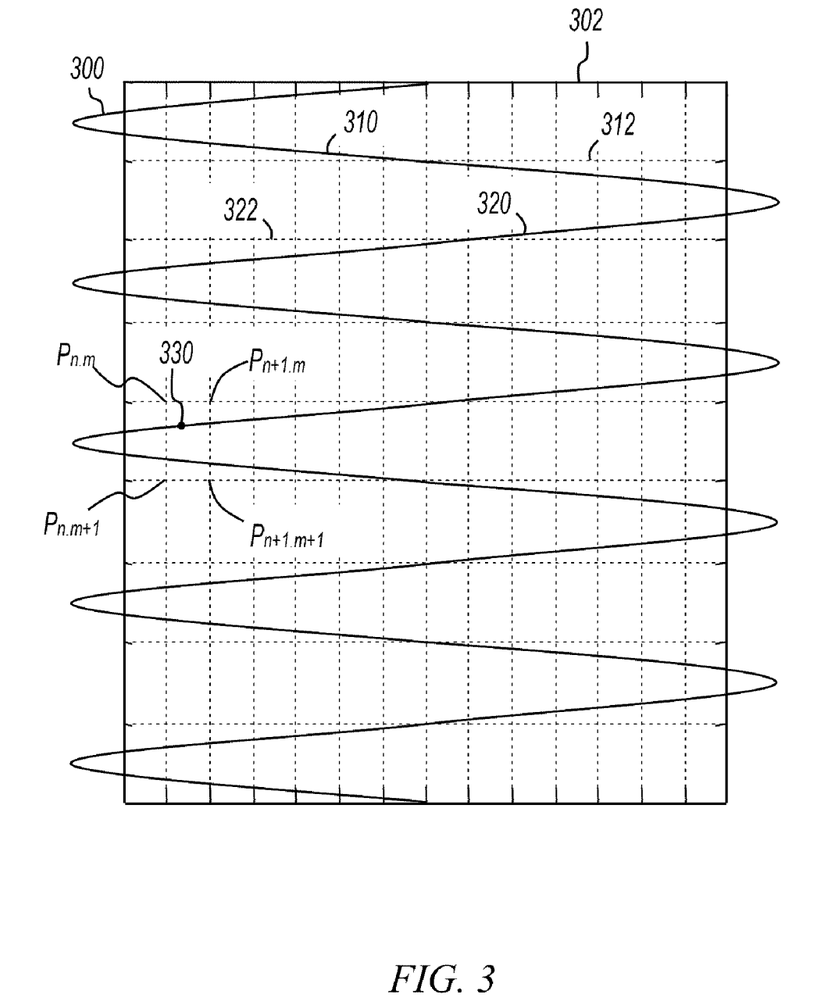
FIG. 3 shows a scan trajectory having a sinusoidal horizontal component and a linear vertical component.

FIG. 3 shows a scan trajectory having a sinusoidal horizontal component and a linear vertical component. Scan trajectory 300 is shown superimposed upon a grid 302. Grid 302 represents rows and columns of pixels that make up a display image. The rows of pixels are aligned with the horizontal dashed lines, and columns of pixels are aligned with the vertical dashed lines. The image is made up of pixels that occur at the intersections of dashed lines. Scan trajectory 300 has a sinusoidal horizontal component and a linear vertical component. On this trajectory, the beam sweeps back and forth left to right in a sinusoidal pattern, and sweeps vertically at a substantially constant rate. In some embodiments, the trajectory sweeps up quickly during a "flyback" and pixels are not displayed on the retrace. In other embodiments, the trajectory sweeps up linearly at the same rate as it swept down, and pixels are displayed during both up and down vertical sweeps.

As described above with reference to FIG. 1, the projection system that produces scan trajectory 300 uses a pixel clock that may occur at times that do not align with pixels in the frame buffer. This results in displayed pixels that do not necessarily correspond in position to the pixels in grid 302. For example, a pixel clock may occur at point 330 which lies to the right of pixel $P_n$ and to the left of pixel $P_{n+1}$ in row m of grid 302. In some embodiments, the projection system may interpolate pixel intensity values in one dimension. For example, the projection system may interpolate pixel intensity values between $P_{n,m}$ and $P_{n+1,m}$, and display the resulting pixel intensity at point 330. In other embodiments, the projection system may interpolate pixel intensity values in two dimensions. For example, the projection system may interpolate pixel intensity values between $P_{n,m}$, $P_{n+1,m}$, $P_{n,m+1}$, and $P_{n+1,m+1}$, and display the resulting pixel intensity at point 330.

Displayed pixels may outnumber pixels in the grid. For example, because the horizontal sinusoidal trajectory sweeps faster in the center than at either the left or right sides, a linear pixel clock that displays at least one pixel per column near the horizontal center will display more than one pixel per column near the left and right sides. In some embodiments, the pixel clock and sweep frequencies are timed to display about two pixels per column in the center, and about eight or more pixels per column near the left and right sides. Interpolation between neighboring pixels allows the pixel clock to "land" anywhere between pixels within the grid while still displaying the correct data.

In some embodiments, the vertical sweep rate is set such that the number of horizontal sweeps equals the number of rows in the grid. For example, as shown in FIG. 3, each horizontal sweep 310 from left to right may corresponds to one row 312 and the following sweep from right to left 320 may correspond to the next row 322. In these embodiments, the vertical scan position at any time may be approximated as a corresponding row. This introduces some image distortion where the displayed pixels are clustered near the left and right sides of the image, but also reduces processing complexity. In other embodiments, the vertical sweep rate is independent of, and not related to, the number of rows in the grid.

In some embodiments, pixels are displayed during both sweeps of the horizontal trajectory. For example, pixels may be displayed left-to-right during horizontal sweep 310, and right-to-left during horizontal sweep 320. If the horizontal beam position information at 172 (FIG. 1) is subject to a varying delay (e.g., because of time variant amplifier 182), then image distortion will occur. For example, if the delay increases, then pixels in horizontal sweep 310 are displayed further to the right, and pixels in horizontal sweep 320 are displayed further to the left. As explained below with reference to FIG. 4, beam position determination component 170 compensates for these delays and reduces distortion.

Figure 4:
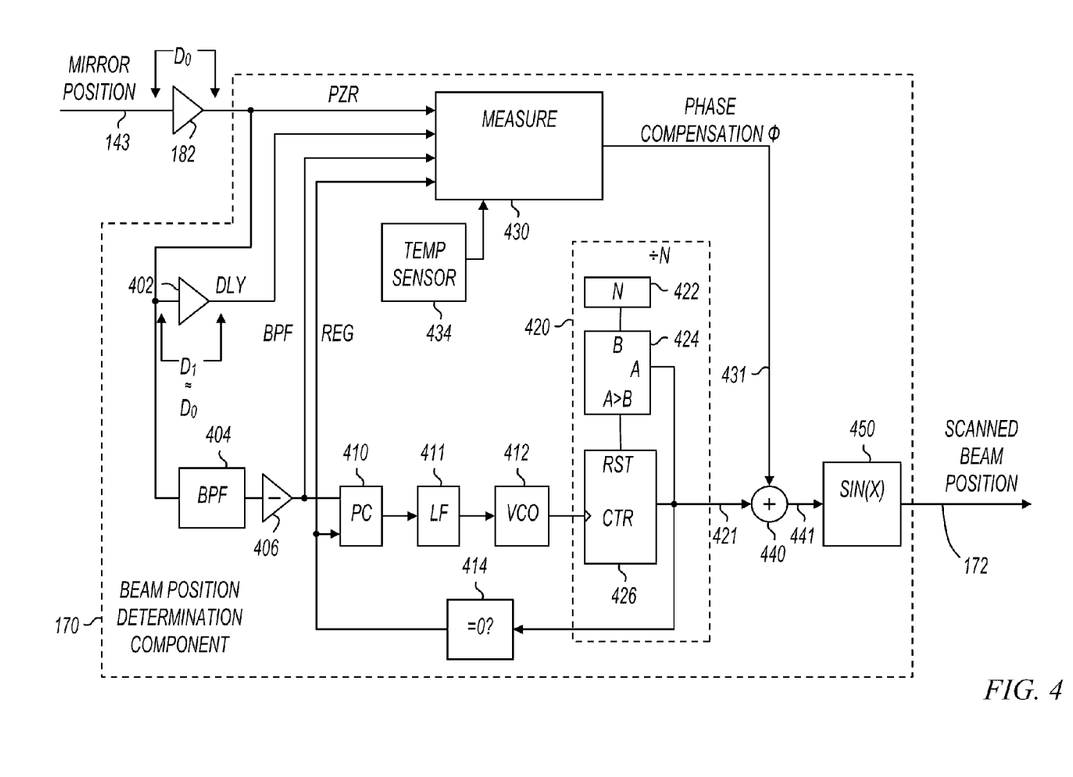
FIG. 4 shows an amplifier and a beam position determination component.

FIG. 4 shows an amplifier and a beam position determination component. Amplifier 182 receives the mirror position signal at 143. This is also shown in FIG. 1. The delay through amplifier 182 is shown as $D_0$. The amplified position signal is designated PZR. Beam position determination component 170 receives the amplified position signal PZR, and produces the scanned beam horizontal position signal at 172.

Beam position determination component 170 includes bandpass filter (BPF) 404, inverting amplifier 406, phase comparator (PC) 410, loop filter (LF) 411, voltage controlled oscillator (VCO) 412, divide-by-N circuit 420, and zero detector 414. In operation, BPF 404 narrows the spectrum of the amplified position signal PZR, and inverting amplifier 406 inverts it. The output of inverting amplifier 406 is designated BPF. Phase comparator 410 compares the phase of signals BPF and REG, which is the output from zero detector 414.

Phase comparator 410, loop filter 411, VCO 412, divide-by-N circuit 420, and zero detector 414 form a phase locked loop. The phase locked loop outputs an uncompensated phase value at 421. The uncompensated phase value at 421 represents the scanned beam horizontal position information subject to variations caused by variations in the delay through amplifier 182 ($D_0$), as well as other delays (e.g., delays through BPF 404 and inverting amplifier 406.

As explained further below, a phase compensation value Φ at 431 is generated to compensate for the above-mentioned variations. The phase compensation value Φ at 431 is a phase offset that is summed with the uncompensated phase value at 421 by adder 440 to produce a compensated phase value at 441. The compensated phase value at 441 is input to sin(x) block 450, which outputs the scanned beam horizontal position at 172. The sin(x) block 450 may be implemented in any suitable fashion, including a CORDIC algorithm, a lookup table, or the like.

Loop filter 411 takes phase error information from phase comparator 410 and integrates it, such that any phase error will cause VCO 412 to be driven to a new frequency which will cancel that phase error. Thus, the average phase error at the two inputs to phase comparator 410 is zero.

Divide-by-N circuit 420 includes digital counter 426, comparator 424, and register 422. Register 422 is programmed with a value "N", and comparator 424 compares the value "N" with the output of digital counter 426. Digital counter 426 counts from zero to "N-1" and then resets back to zero. By operation of the phase locked loop, counter 426 counts from zero to "N-1" for each period of BPF, which corresponds to one complete horizontal sinusoidal cycle of the mirror that produces the position information at 143. Accordingly, the 360 degrees of one complete cycle of the mirror is divided into "N" equal phase increments. "N" can be modified to increase or decrease the phase increment size.

Beam position determination component 170 also includes measurement circuit 430, temperature sensor 434, and replica amplifier 402. Replica amplifier 402 is an amplifier designed to have substantially the same time variant characteristics as amplifier 182. The output of replica amplifier 402 is designated DLY. In some embodiments, an attenuator is provided at the input to replica amplifier 402 so that the input signal levels of the amplifiers are more closely matched. The delay through replica amplifier 402 is shown as $D_1$, which closely approximates $D_0$.

Measurement circuit 430 receives the signals PZR, DLY, BPF, and REG. Measurement circuit 430 also receives the output from temperature sensor 434. Measurement circuit 430 measures various time differences between the received signals, and then in combination with a function of temperature, determines the phase compensation value Φ at 431. This is shown in more detail in FIG. 5.

Measurement circuit 430 may be implemented in any suitable manner. For example, in some embodiments, measurement circuit 430 includes digital counters, adders, and subtractors operating at a known clock frequency. Also for example, in some embodiments, measurement circuit 430 may include analog circuits such as comparators to determine time differences. One skilled in the art will appreciate that there are many ways to implement measurement circuit 430 without departing from the scope of the present invention.

In some embodiments, measurement circuit 430 receives an initial phase compensation value from an external source. For example, in some embodiments, a user interface may accept an initial phase compensation value from an operator, and this initial phase compensation value may be used as an initial phase compensation value Φ at 431. Measurement circuit 430 may then operate as described to maintain the phase compensation value Φ at 431 as necessary.

Figure 5:
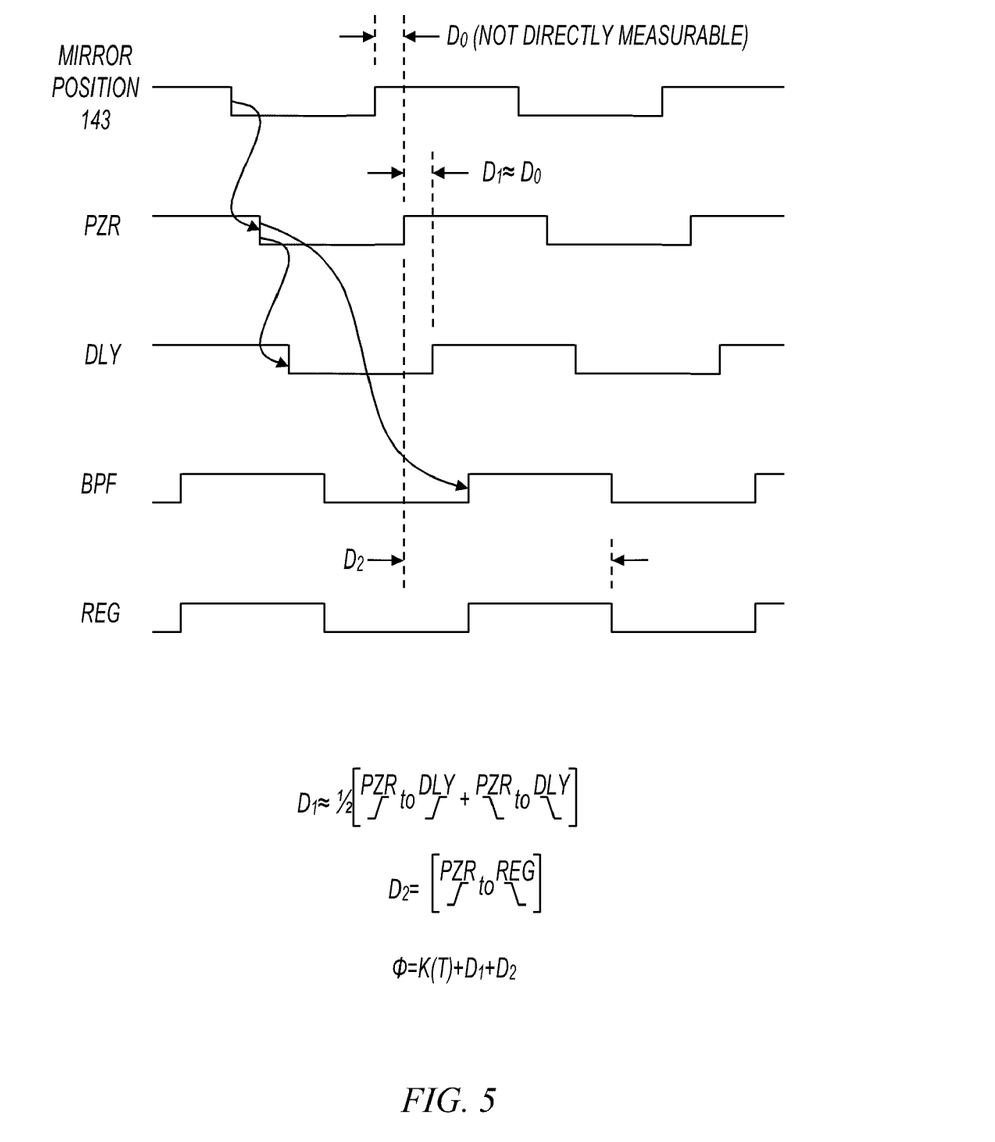
FIG. 5 shows waveforms in accordance with various embodiments of the present invention.

FIG. 5 shows waveforms in accordance with various embodiments of the present invention. Mirror position signal 143 is shown at the top, with PZR shown directly below. The time difference between the mirror position signal at 143 and PZR is equal to $D_0$, but this is not directly measurable since connecting a measurement circuit at 143 may corrupt the mirror position signal.

The replica amplifier output signal DLY is shown below PZR, and BPF and REG are shown below that. The time difference between PZR and DLY is equal to $D_1$, which approximates $D_0$. As shown in FIG. 5, in some embodiments, $D_1$ is determined as an average between rising edge delays and falling edge delays. The time difference between PZR and REG is designated $D_2$. As shown in FIG. 5, the phase compensation value Φ at 431 is determined as:

$$\Phi = K(T) + D_1 + D_2 \quad (1)$$

where K(T) is a temperature dependent offset. The temperature dependent offset may be determined from a lookup table, a mathematical function, or the like. In some embodiments, the function K is determined during a calibration over temperature.

In some embodiments, $D_1$ and $D_2$ are instantaneous measurements from one signal edge to another signal edge. In other embodiments, $D_1$ and $D_2$ are averaged over multiple measurements. For example, in some embodiments, $D_1$ and $D_2$ are averaged over a video frame, and in other embodiments, $D_1$ and $D_2$ are averaged over multiple video frames.

Figure 6:
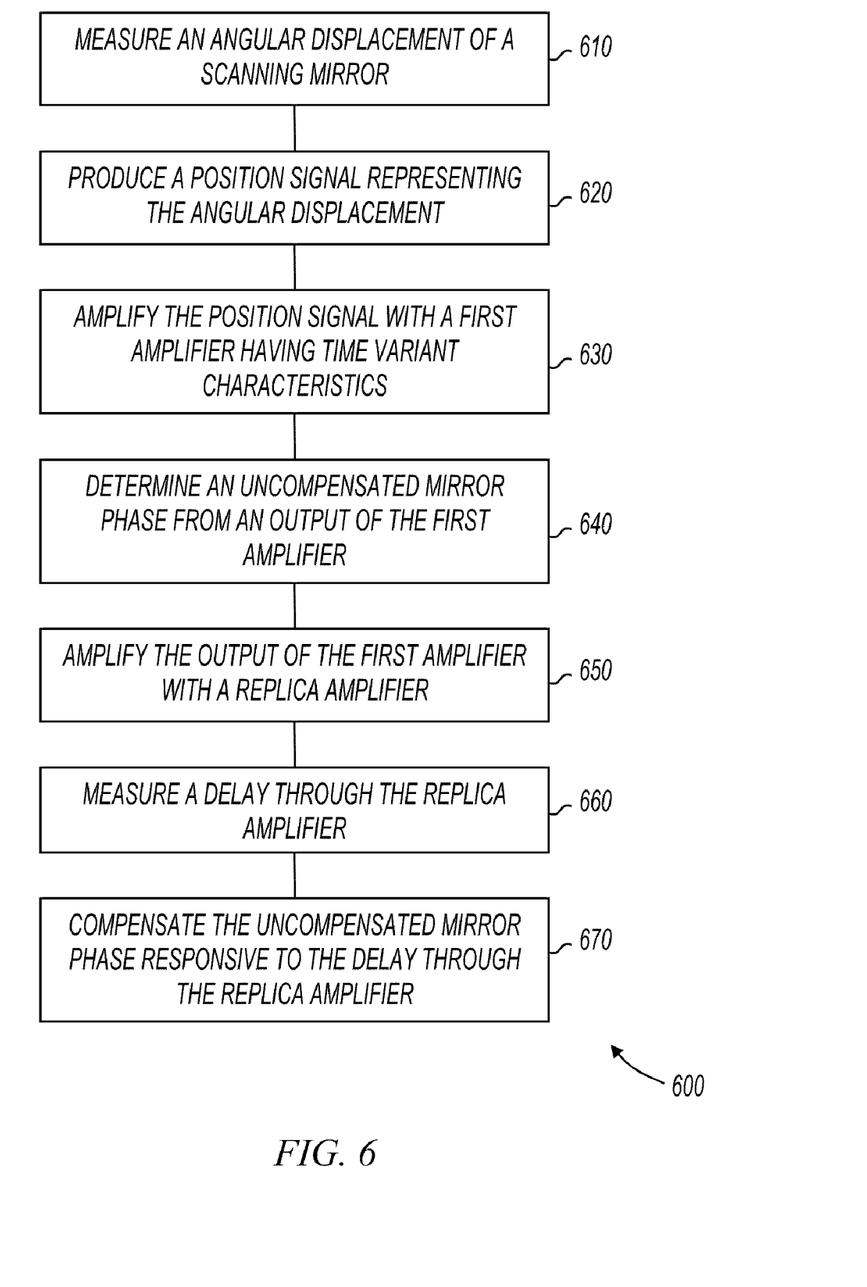
FIG. 6 shows a flowchart in accordance with various embodiments of the present invention.

FIG. 6 shows a flowchart in accordance with various embodiments of the present invention. In some embodiments, method 600, or portions thereof, is performed by a scanning projector with a beam position determination component, embodiments of which are shown in previous figures. In other embodiments, method 600 is performed by an integrated circuit or an electronic system. Method 600 is not limited by the particular type of apparatus performing the method. The various actions in method 600 may be performed in the order presented, or may be performed in a different order. Further, in some embodiments, some actions listed in FIG. 6 are omitted from method 600.

Method 600 is shown beginning with block 610 in which an angular displacement of a scanning mirror is measured. At 620, a position signal that represents a position of a scanning mirror is produced. In some embodiments, the angular displacement is measured with piezoresistive sensors such as those described with reference to FIG. 2. In other embodiments, the angular displacement is measured differently.

At 630, the position signal is amplified with a first amplifier having time variant characteristics. For example, the position signal may be amplified with amplifier 182 (FIGS. 1, 4). The delay through the amplifier may vary as a function of time, temperature, or any other variable.

At 640, an uncompensated mirror phase is determined from the output of the first amplifier. In some embodiments, a phase locked loop is employed to determine an uncompensated phase value. For example, referring now back to FIG. 4, the phase locked loop that includes PC 410, VCO 412, and divide-by-N circuit 420 produces an uncompensated phase value at 421.

At 650, the output of the first amplifier is amplified by a replica amplifier that is substantially matched to the first amplifier. For example, the replica amplifier may exhibit substantially the same time variant characteristics as the first amplifier. In some embodiments, the output of the first amplifier is attenuated prior to being amplified by the replica amplifier so that the input signals to the two amplifiers have substantially the same magnitude.

At 660, the delay through the replica amplifier is measured. A measurement circuit such as measurement circuit 430 (FIG. 4) may measure the delay through the delay amplifier by measuring the time difference between the output of the first amplifier and the output of the replica amplifier.

At 670, the uncompensated mirror phase is compensated responsive to the delay through the replica amplifier. This corresponds to summing the phase compensation value Φ at 431 (FIG. 4) to the uncompensated phase value at 421. In some embodiments, the phase compensation is a function of more than just the delay through the replica amplifier. For example, the phase compensation may also be a function of temperature and/or other delays within the system.

The compensated mirror phase is then passed through a sin(x) block to determine the scanned beam mirror position. The scanned beam mirror position is then provided to an interpolation component that interpolates between input pixel data to determine display pixel data. In some embodiments, pixel data is interpolated in one dimension, and in other embodiments, pixel data is interpolated in two dimensions.

Figure 7:
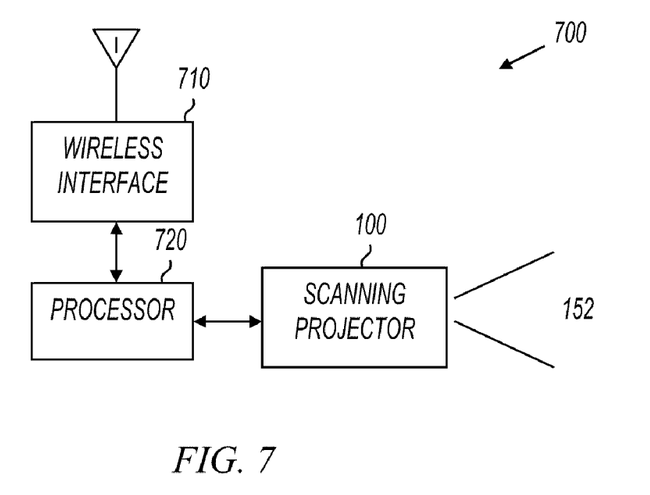
FIG. 7 shows a block diagram of a mobile device in accordance with various embodiments of the present invention.

FIG. 7 shows a block diagram of a mobile device in accordance with various embodiments of the present invention. As shown in FIG. 7, mobile device 700 includes wireless interface 710, processor 720, and scanning projector 100. Scanning projector 100 paints a raster image at 152. Scanning projector 100 is described with reference to FIG. 1. In some embodiments, scanning projector 100 includes a beam position determination component that compensates for time variant characteristics of an amplifier such as amplifier 182 (FIGS. 1, 4).

Scanning projector 100 may receive image data from any image source. For example, in some embodiments, scanning projector 100 includes memory that holds still images. In other embodiments, scanning projector 100 includes memory that includes video images. In still further embodiments, scanning projector 100 displays imagery received from external sources such as connectors, wireless interface 710, or the like.

Wireless interface 710 may include any wireless transmission and/or reception capabilities. For example, in some embodiments, wireless interface 710 includes a network interface card (NIC) capable of communicating over a wireless network. Also for example, in some embodiments, wireless interface 710 may include cellular telephone capabilities. In still further embodiments, wireless interface 710 may include a global positioning system (GPS) receiver. One skilled in the art will understand that wireless interface 710 may include any type of wireless communications capability without departing from the scope of the present invention.

Processor 720 may be any type of processor capable of communicating with the various components in mobile device 700. For example, processor 720 may be an embedded processor available from application specific integrated circuit (ASIC) vendors, or may be a commercially available microprocessor. In some embodiments, processor 720 provides image or video data to scanning projector 100. The image or video data may be retrieved from wireless interface 710 or may be derived from data retrieved from wireless interface 710. For example, through processor 720, scanning projector 100 may display images or video received directly from wireless interface 710. Also for example, processor 720 may provide overlays to add to images and/or video received from wireless interface 710, or may alter stored imagery based on data received from wireless interface 710 (e.g., modifying a map display in GPS embodiments in which wireless interface 710 provides location coordinates).

Figure 8:
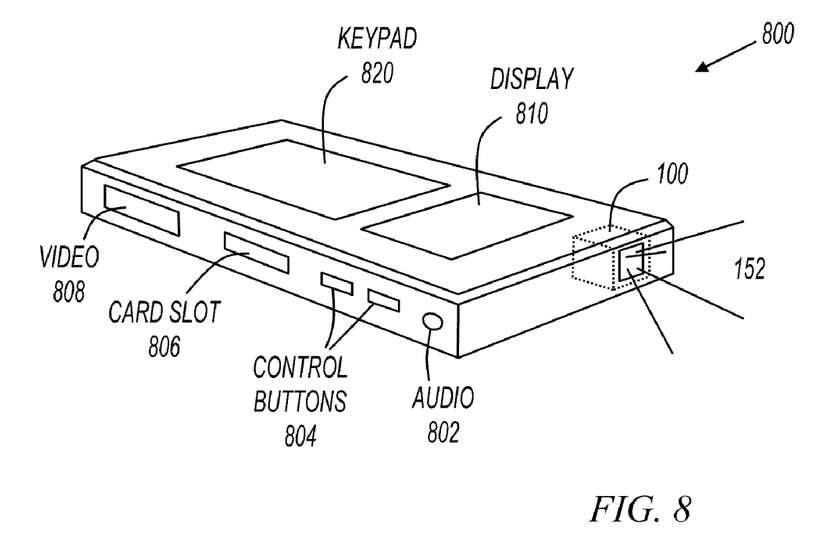
FIG. 8 shows a mobile device in accordance with various embodiments of the present invention.

FIG. 8 shows a mobile device in accordance with various embodiments of the present invention. Mobile device 800 may be a hand held projection device with or without communications ability. For example, in some embodiments, mobile device 800 may be a handheld projector with little or no other capabilities. Also for example, in some embodiments, mobile device 800 may be a device usable for communications, including for example, a cellular phone, a smart phone, a personal digital assistant (PDA), a global positioning system (GPS) receiver, or the like. Further, mobile device 800 may be connected to a larger network via a wireless (e.g., WiMax) or cellular connection, or this device can accept data messages or video content via an unregulated spectrum (e.g., WiFi) connection.

Mobile device 800 includes scanning projector 100 to create an image with light at 152. Mobile device 800 also includes many other types of circuitry; however, they are intentionally omitted from FIG. 8 for clarity.

Mobile device 800 includes display 810, keypad 820, audio port 802, control buttons 804, card slot 806, and audio/video (A/V) port 808. None of these elements are essential. For example, mobile device 800 may only include scanning projector 100 without any of display 810, keypad 820, audio port 802, control buttons 804, card slot 806, or A/V port 808. Some embodiments include a subset of these elements. For example, an accessory projector product may include scanning projector 100, control buttons 804 and A/V port 808.

Display 810 may be any type of display. For example, in some embodiments, display 810 includes a liquid crystal display (LCD) screen. Display 810 may always display the same content projected at 152 or different content. For example, an accessory projector product may always display the same content, whereas a mobile phone embodiment may project one type of content at 152 while display different content on display 810. Keypad 820 may be a phone keypad or any other type of keypad.

A/V port 808 accepts and/or transmits video and/or audio signals. For example, A/V port 808 may be a digital port that accepts a cable suitable to carry digital audio and video data. Further, A/V port 808 may include RCA jacks to accept composite inputs. Still further, A/V port 808 may include a VGA connector to accept analog video signals. In some embodiments, mobile device 800 may be tethered to an external signal source through A/V port 808, and mobile device 800 may project content accepted through A/V port 808. In other embodiments, mobile device 800 may be an originator of content, and A/V port 808 is used to transmit content to a different device.

Audio port 802 provides audio signals. For example, in some embodiments, mobile device 800 is a media player that can store and play audio and video. In these embodiments, the video may be projected at 152 and the audio may be output at audio port 802. In other embodiments, mobile device 800 may be an accessory projector that receives audio and video at A/V port 808. In these embodiments, mobile device 800 may project the video content at 152, and output the audio content at audio port 802.

Mobile device 800 also includes card slot 806. In some embodiments, a memory card inserted in card slot 806 may provide a source for audio to be output at audio port 802 and/or video data to be projected at 152. Card slot 806 may receive any type of solid state memory device, including for example, Multimedia Memory Cards (MMCs), Memory Stick DUOs, secure digital (SD) memory cards, and Smart Media cards. The foregoing list is meant to be exemplary, and not exhaustive.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanned beam projection device comprising:
    a mirror that oscillates in at least one dimension to scan a light beam;
    a position sensor to sense a position of the mirror;
    a first amplifier coupled to receive a signal from the position sensor, the first amplifier having time variant characteristics;
    a second amplifier having characteristics substantially matched to the first amplifier, the second amplifier coupled to receive a signal from the first amplifier; and
    a circuit to measure a delay through the second amplifier and to compensate for the time variant characteristics of the first amplifier.

2. The scanned beam projection device of claim 1 further comprising a bandpass filter coupled to receive the signal from the first amplifier.

3. The scanned beam projection device of claim 2 further comprising a phase locked loop responsive to a signal from the bandpass filter, the phase locked loop including a voltage controlled oscillator and a frequency divider circuit.

4. The scanned beam projection device of claim 3 wherein the frequency divider circuit includes a digital counter that outputs a digital word representing an uncompensated phase value.

5. The scanned beam projection device of claim 4 further comprising an adder to add a phase compensation value from the circuit to measure a delay to the digital word representing an uncompensated phase value.

6. The scanned beam projection device of claim 5 further comprising a sin(x) component coupled to receive an output from the adder and to output a compensated mirror position signal.

7. The scanned beam projection device of claim 6 further comprising an interpolation component coupled to interpolate pixel data responsive to the sin(x) component.

8. The scanned beam projection device of claim 1 further comprising a radio transceiver.

9. A method comprising:
    measuring an angular displacement of a scanning mirror;
    producing a position signal representing the angular displacement;
    amplifying the position signal with a first amplifier having time variant characteristics;
    determining an uncompensated mirror phase from an output of the first amplifier;
    amplifying the output of the first amplifier with a replica amplifier;
    measuring a delay through the replica amplifier; and
    compensating the uncompensated mirror phase responsive to the delay through the replica amplifier.

10. The method of claim 9 further comprising attenuating the output of the first amplifier prior to amplifying the output of the first amplifier.

11. The method of claim 9 wherein determining an uncompensated mirror phase comprises determining an uncompensated phase value from the output of the first amplifier.

12. The method of claim 11 wherein compensating comprises adding a phase compensation value to the uncompensated phase to produce a compensated phase value representing the mirror's angular displacement.

13. The method of claim 12 further comprising interpolating pixel data based on the compensated phase value representing the mirror's angular displacement.

* * * * *